US011262668B1

(12) United States Patent
Masuda

(10) Patent No.: US 11,262,668 B1
(45) Date of Patent: Mar. 1, 2022

(54) IMAGE FORMING APPARATUS

(71) Applicant: TOSHIBA TEC KABUSHIKI KAISHA, Tokyo (JP)

(72) Inventor: Yoshihisa Masuda, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/209,864

(22) Filed: Mar. 23, 2021

(51) Int. Cl.
*G03G 15/043* (2006.01)
*G02B 26/12* (2006.01)

(52) U.S. Cl.
CPC ........... *G03G 15/043* (2013.01); *G02B 26/12* (2013.01)

(58) Field of Classification Search
CPC ........... G03G 15/04036; G03G 15/041; G03G 15/0415; G03G 15/043; G02B 26/12
See application file for complete search history.

(56) References Cited

U.S. PATENT DOCUMENTS

| 2010/0189453 | A1  | 7/2010 | Ogasahara |
|---|---|---|---|
| 2010/0225729 | A1* | 9/2010 | Fujise ................... B41J 2/473 347/224 |
| 2010/0232817 | A1  | 9/2010 | Miyadera et al. |
| 2015/0002599 | A1* | 1/2015 | Kondo ............ G03G 15/04036 347/134 |

FOREIGN PATENT DOCUMENTS

JP  2008-134451  6/2008

* cited by examiner

*Primary Examiner* — Hoang X Ngo
(74) *Attorney, Agent, or Firm* — Foley & Lardner LLP

(57) ABSTRACT

An image forming apparatus includes a controller. The controller is configured to switch between (i) first speed printing in which a rotation speed of the polygon mirror is a first speed and the power of a laser beam from a first and second laser light sources is a first laser power, and (ii) second speed printing in which the speed of the mirror is slower than the first speed and the power of laser beam from the light sources is a second power weaker than the first power. The controller is configured to control an output timing of the laser beam from the light sources in the second speed printing based on the timings at which the laser beam is detected by first photodetector and second photodetectors when the laser powers of the first laser light source and the second laser light source are changed, respectively.

20 Claims, 4 Drawing Sheets

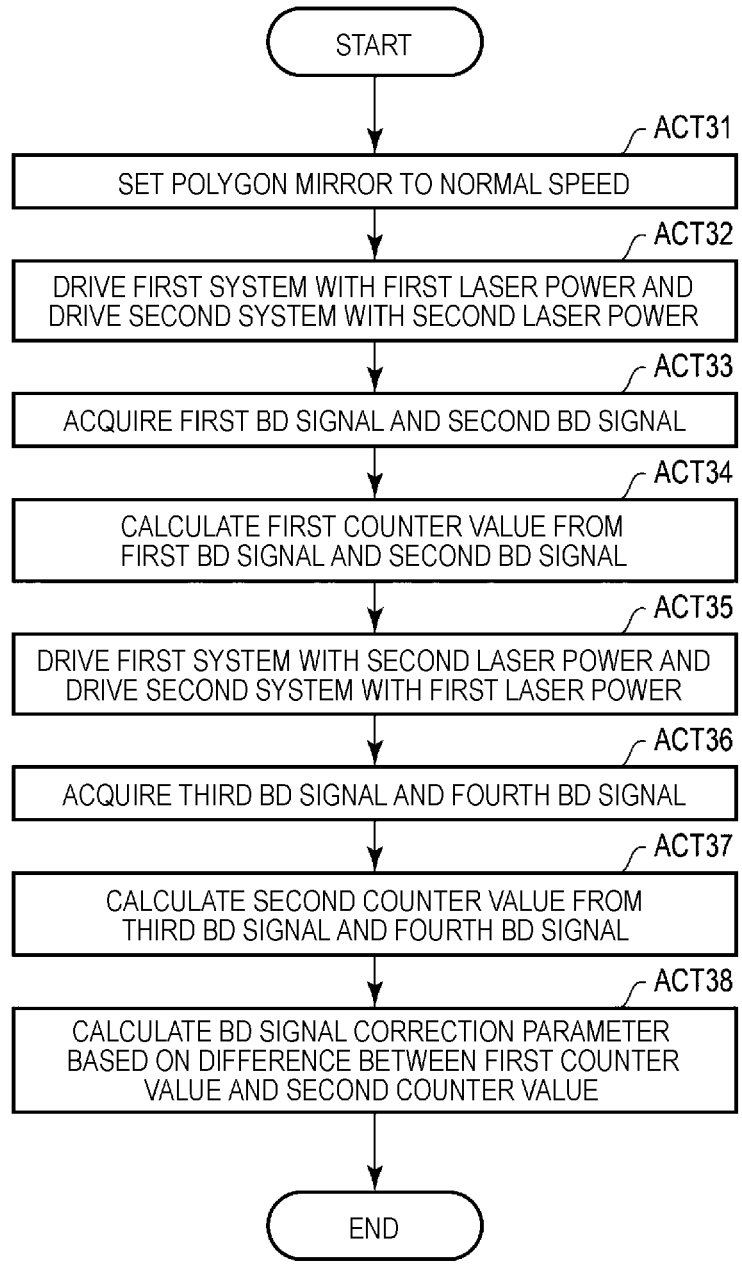

IMAGE FORMING APPARATUS

FIELD

Embodiments described herein relate generally to an image forming apparatus.

BACKGROUND

An image forming apparatus includes a plurality of process units (e.g., processors), an exposure device, a transfer mechanism, a fixing device, and the like. The process unit includes a photoreceptor and a developing device. The image forming apparatus irradiates an electrified and rotating photoreceptor with a laser beam based on an image by the exposure device to form an electrostatic latent image on the photoreceptor. The image forming apparatus causes toner to adhere to the electrostatic latent image on the photoreceptor by the developing device to form a toner image on the photoreceptor. The image forming apparatus transfers the toner image on the photoreceptor to a recording medium, such as paper, by the transfer mechanism. The image forming apparatus fixes the toner image transferred to the recording medium by the fixing device.

The exposure device may be, for example, an exposure device of an electrophotographic type using a laser scanning unit (LSU). The exposure device includes a plurality of laser light sources, a polygon mirror, a plurality of optical members, and a photodetector. The laser light source outputs a laser beam. The polygon mirror includes a plurality of reflecting surfaces that reflect the laser beam output from the laser light source, and rotates at a predetermined speed. The plurality of optical members make the laser beam reflected by the reflecting surface of the polygon mirror incident onto the photoreceptor. The photodetector detects the laser beam output from the laser light source and reflected by the polygon mirror.

According to such a configuration, the laser beam output from the laser light source is reflected by the reflecting surface of the rotating polygon mirror, so that an advancing direction changes with time. With this configuration, the laser beam output from the laser light source is scanned on the photoreceptor in a main scanning direction. The image forming apparatus controls an output timing of the laser beam by the laser light source based on the timing at which the laser beam is detected by the photodetector.

DESCRIPTION OF THE DRAWINGS

FIG. 4 is a flowchart for illustrating an example of the operation of the image forming apparatus according to at least one embodiment.

DETAILED DESCRIPTION

Figure 1:
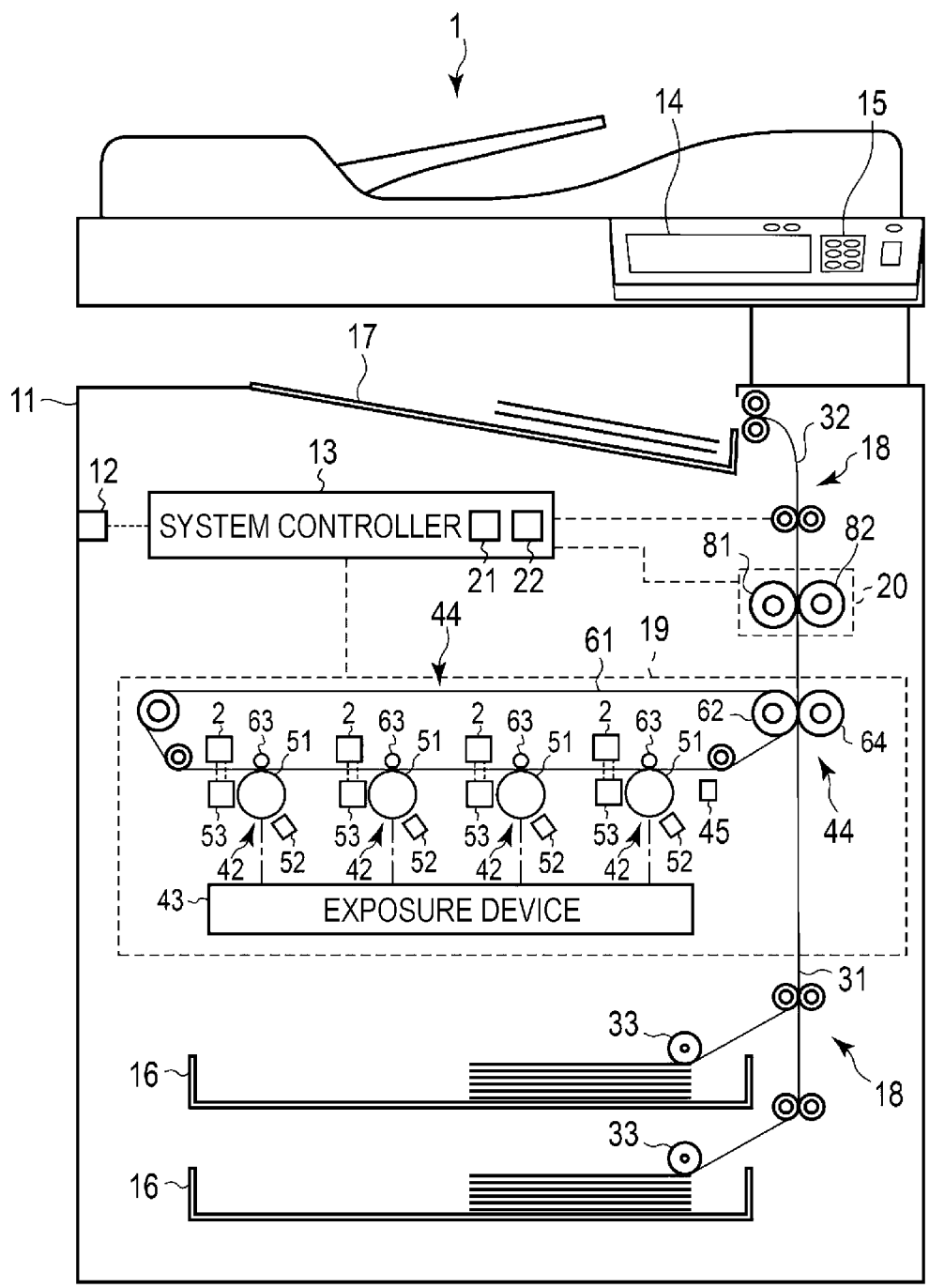
FIG. 1 is a diagram for illustrating a configuration example of an image forming apparatus according to at least one embodiment.

An image forming apparatus as described above performs printing at a normal speed and printing in a decelerated state slower than the normal speed. When the printing speed becomes relatively slower, a rotation speed of the polygon mirror and a rotation speed of the photoreceptor also become slower. When the printing speed becomes slower and the rotation speeds of the polygon mirror and the photoreceptor also become slower, the time when the laser beam is incident per unit area of the photoreceptor becomes longer. For example, if laser power of the laser beam from the laser light source is the same and the time when the laser beam is incident per unit area of the photoreceptor is long, the density of the toner image formed on the recording medium becomes higher. For that reason, when the printing speed is slowed down, the image forming apparatus reduces the laser power of the laser beam output from the laser light source and suppresses a change in the density of the toner image.

Due to mounting errors or manufacturing variations of a plurality of process units, there is a possibility that a position of the toner image transferred from the photoreceptor may deviate on an image carrier such as a transfer belt of the transfer mechanism. For that reason, the image forming apparatus forms a toner image of a test pattern on the image carrier, generates a correction parameter based on a detection result of the test pattern, and controls the timing at which the photoreceptor is irradiated with light from the exposure device based on the correction parameter. As described above, the image forming apparatus performs image quality stabilizing processing that controls the timing at which the photoreceptor of each process unit is irradiated with the laser beam based on the position where the test pattern is formed on the image carrier.

When light intensity of the laser beam output from the laser light source changes, the time changes from when the laser beam enters the photodetector until the light detector outputs a signal indicating that the laser beam is detected. For these reasons, the image forming apparatus has disadvantages, in that a correction parameter for image quality stabilization processing needs to be generated for each printing speed and it takes time to generate the parameter.

In general, according to at least one embodiment, an image forming apparatus is provided including a first photoreceptor and a second photoreceptor that are configured to rotate, a polygon mirror configured to reflect a laser beam while rotating, a first laser light source configured to reflect the laser beam on the polygon mirror and scan the laser beam in a first direction along a main scanning direction on the first photoreceptor to form an electrostatic latent image, and a second laser light source configured to reflect the laser beam on the polygon mirror and scan the laser beam in a second direction along the main scanning direction on the second photoreceptor and opposite to the first direction to form an electrostatic latent image. The image forming apparatus includes a first developing device configured to form a toner image by adhering toner to the electrostatic latent image of the first photoreceptor, a second developing device configured to form a toner image by adhering the toner to the electrostatic latent image of the second photoreceptor, and a transfer mechanism configured to transfer the toner images on the first photoreceptor and the second photoreceptor to an image carrier. The image forming apparatus includes a first photodetector configured to detect the laser beam output from the first laser light source and reflected by the polygon mirror and a second photodetector configured to detect the laser beam output from the second laser light source and reflected by the polygon mirror. The image forming apparatus includes a controller configured to determine an exposure start position of the laser beam to the first photoconductor based on a timing at which the laser beam is detected by the first photodetector and determine an exposure start position of the laser beam to the second photoconductor based on a timing at which the laser beam is detected by the second photodetector. The controller is configured to switch between a first speed printing and a second speed printing, in which a rotation speed of the polygon mirror in the first speed printing is a first speed and power of the laser beam from the first and second laser light sources is a first laser power, and the rotation speed of the polygon mirror in the second speed printing is a second speed slower than the first speed and the power of the laser beam from the first and second laser light sources is a second laser power weaker than the first laser power. The controller is configured to control an output timing of the laser beam from the first laser light source and the second laser light source in the second speed printing based on the timing at which the laser beam is detected by the first photodetector and the timing at which the laser beam is detected by the second photodetector when the laser powers of the first laser light source and the second laser light source are changed, respectively.

Hereinafter, the image forming apparatus according to at least one embodiment will be described with reference to the drawings.

FIG. 1 is an explanatory diagram for illustrating a configuration example of an image forming apparatus 1 according to at least one embodiment.

The image forming apparatus 1 is, for example, a multi-function printer (MFP) that performs various processing operations, such as image forming, while conveying a recording medium. The image forming apparatus 1 has a configuration in which an image is formed on the recording medium by using toner replenished from a toner cartridge.

For example, the image forming apparatus 1 has a configuration in which toner is received from a toner cartridge 2 and an image is formed on the recording medium by the received toner. The image forming apparatus 1 receives toner from each of a plurality of toner cartridges 2 holding toners of different colors such as cyan, magenta, yellow, and black, and forms a toner image.

As illustrated in FIG. 1, the image forming apparatus 1 includes a casing 11, a communication interface 12, a system controller 13, a display unit 14 (e.g., a display), an operation interface 15, a paper feed cassette 16, a paper discharge tray 17, a conveyance mechanism (conveyor) 18, an image forming unit 19 (e.g., an image forming device), and a fixing device (fixer) 20.

The casing 11 is a main body of the image forming apparatus 1. The casing 11 accommodates the communication interface 12, the system controller 13, the display unit 14, the operation interface 15, the paper feed cassette 16, the paper discharge tray 17, the conveyance mechanism 18, the image forming unit 19, and the fixing device 20.

The communication interface 12 is an interface that relays communication with other devices. The communication interface 12 is used, for example, for communication with a client. The client is, for example, an information processing device such as a personal computer, a smartphone, or a tablet PC. The communication interface 12 is configured as, for example, a LAN connector or the like. The communication interface 12 may be configured to perform wireless communication with the client according to a standard such as Bluetooth (registered trademark) or Wi-fi (registered trademark).

The system controller 13 controls the image forming apparatus 1. The system controller 13 includes, for example, a processor 21 and a memory 22.

The processor 21 is an operational element that executes operational processing. The processor 21 is, for example, a CPU. The processor 21 performs various processing based on data such as a program stored in the memory 22 (e.g., so as to carry out instructions that are stored in the memory 22). The processor 21 functions as a control unit (e.g., a controller or microcontroller) capable of executing various operations by executing the program stored in the memory 22.

The memory 22 is a storage medium for storing a program and data used in the program. The memory 22 also functions as a working memory. That is, the memory 22 temporarily stores data being processed by the processor 21, the program executed by the processor 21, and the like.

The processor 21 performs various information processing by executing the program stored in the memory 22. For example, the processor 21 controls data transmission and reception by the communication interface 12, screen display by the display unit 14, operation input by the operation interface 15, conveyance of the recording medium by the conveyance mechanism 18, image forming processing by the image forming unit 19, and fixing processing by the fixing device 20, and the like. The processor 21 generates a print job based on an image acquired from an external device via the communication interface 12. The processor 21 stores the generated print job in the memory 22.

The print job includes image data indicating an image to be formed on the recording medium. The image data may be data for forming an image on one recording medium, or may be data for forming an image on a plurality of recording media. Furthermore, the print job contains information indicating whether printing is color printing or monochrome printing.

The processor 21 functions as a controller (engine controller) that controls the operations of the conveyance mechanism 18, the image forming unit 19, and the fixing device 20 by executing the program stored in the memory 22. That is, the processor 21 controls the conveyance of the recording medium by the conveyance mechanism 18. The processor 21 controls formation of an image on the recording medium by the image forming unit 19. The processor 21 controls the fixing of the image on the recording medium by the fixing device 20.

The image forming apparatus 1 may be configured to include an engine controller separately from the system controller 13. For example, the image forming apparatus 1 may include an engine controller corresponding to each of the conveyance mechanism 18, the image forming unit 19, and the fixing device 20. That is, the image forming apparatus 1 may include an engine controller that controls the conveyance of recording media by the conveyance mechanism 18, an engine controller that controls formation of the image on the recording medium by the image forming unit 19, and an engine control that controls fixing of the image on the recording medium by the fixing device 20, respectively. In this case, the system controller 13 supplies the engine controller with information needed for control in the engine controller.

The display unit 14 includes a display that displays a screen according to an input video signal. For example, the display of the display unit 14 displays a screen and the like for various settings of the image forming apparatus 1.

The operation interface 15 includes an operation member that generates an operation signal based on a user's operation.

The paper feed cassette 16 is a cassette that accommodates the recording medium. The paper feed cassette 16 is configured so that the recording medium can be supplied from the outside of the casing 11. For example, the paper feed cassette 16 is configured to be drawable from the casing 11.

The paper discharge tray 17 is a tray that supports the recording medium discharged from the image forming apparatus 1.

The conveyance mechanism 18 is configured to supply a recording medium for printing to the image forming unit 19 and discharge the recording medium on which an image is formed by the image forming unit 19 from the casing. For example, the conveyance mechanism 18 includes a paper feed conveyance path 31 and a paper discharge conveyance path 32.

The paper feed conveyance path 31 and the paper discharge conveyance path 32 move the recording medium, respectively.

The paper feed conveyance path 31 takes in the recording medium from the paper feed cassette 16 and supplies the taken-in recording medium to the image forming unit 19. The paper feed conveyance path 31 includes a pickup roller 33 corresponding to each paper feed cassette 16. Each pickup roller 33 takes in the recording medium of the paper feed cassette 16 into the paper feed conveyance path 31.

The paper discharge conveyance path 32 is a conveyance path for discharging the recording medium on which the image is formed from the casing 11. The recording medium discharged via the paper discharge conveyance path 32 is supported by the paper discharge tray 17.

Next, the image forming unit 19 will be described.

The image forming unit 19 has a configuration for forming an image on the recording medium. Specifically, the image forming unit 19 forms the image on the recording medium based on the print job generated by the processor 21.

The image forming unit 19 includes a plurality of process units 42 (e.g., a plurality of processors), an exposure device 43, a transfer mechanism 44, and a plurality of photodetectors 45. The image forming unit 19 is configured so that the toner cartridge 2 can be attached to each process unit 42.

Next, the plurality of process units 42 will be described.

The process unit 42 is configured to form a toner image. For example, each of the plurality of process units 42 is provided for each type of toner. For example, the plurality of process units 42 correspond to color toners such as cyan, magenta, yellow, and black, respectively. Specifically, each of the toner cartridges 2 having toners of different colors is connected to each process unit 42. Since each of the plurality of process units 42 has the same configuration, one process unit 42 will be described as an example.

The process unit 42 includes a photoreceptor drum 51, an electrifying charger 52, and a developing device 53.

The photoreceptor drum 51 is a photoreceptor including a cylindrical drum and a photoreceptive layer formed on the outer peripheral surface of the drum. The photoreceptor drum 51 rotates at a constant speed.

The electrifying charger 52 uniformly electrifies the surface of the photoreceptor drum 51. For example, the electrifying charger 52 applies a voltage to the photoreceptor drum 51 to electrify the photoreceptor drum 51 to a uniform negative electrode potential.

The developing device 53 is a device that makes toner adhere to the photoreceptor drum. The developing device 53 includes a developer container, a stirring mechanism, a developing roller, a doctor blade, and the like.

The developer container is a container that receives and contains the toner sent out from the toner cartridge 2. The carrier is contained in advance in the developer container. The toner sent out from the toner cartridge 2 is stirred with the carrier by the stirring mechanism to form developer in which the toner and the carrier are mixed. The carrier is contained in the developer container, for example, during manufacture of the developing device 53.

The developing roller rotates in the developer container to make the developer adhere to the surface thereof. The doctor blade is a member disposed at a predetermined interval from the surface of the developing roller. The doctor blade removes a part of the developer adhering to the surface of the rotating developing roller. With this configuration, a layer of developer having a thickness corresponding to the interval between the doctor blade and the surface of the developing roller is formed on the surface of the developing roller.

Next, the exposure device 43 will be described.

The exposure device 43 is, for example, an exposure device of an electrophotographic type using a laser scanning unit (LSU). The exposure device 43 outputs a laser beam according to an image to be printed, and irradiates the electrified photoreceptor drum 51 of each process unit 42 with the laser beam. The exposure device 43 scans the laser beam in the main scanning direction, which is a direction parallel to a rotation axis of the photoreceptor drum 51. With this configuration, the exposure device 43 forms an electrostatic latent image for one line on the photoreceptor drum 51. The exposure device 43 continuously irradiates the rotating photoreceptor drum 51 with light to form a plurality of lines of electrostatic latent images on the photoreceptor drum 51. In this state, when the layer of the developer formed on the surface of the developing roller of the developing device 53 is close to the surface of the photoreceptor drum 51, the toner contained in the developer adheres to the electrostatic latent image formed on the surface of the photoreceptor drum 51. With this configuration, a toner image is formed on the surface of the photoreceptor drum 51. The detailed configuration of the exposure device 43 will be described later.

Next, the transfer mechanism 44 will be described.

The transfer mechanism 44 has a configuration in which the toner image formed on the surface of the photoreceptor drum 51 is transferred to the recording medium. The transfer mechanism 44 includes, for example, a primary transfer belt 61, a secondary transfer counter roller 62, a plurality of primary transfer rollers 63, and a secondary transfer roller 64.

The primary transfer belt 61 is an endless belt wound around the secondary transfer counter roller 62 and a plurality of winding rollers. In the primary transfer belt 61, an inner peripheral surface, which is an inner surface thereof, contacts the secondary transfer counter roller 62 and the plurality of winding rollers, and an outer peripheral surface, which is an outer surface thereof, faces the photoreceptor drum 51 of the process unit 42.

The secondary transfer counter roller 62 rotates to convey the primary transfer belt 61 in a predetermined conveyance direction. The plurality of winding rollers are configured to be freely rotatable. The plurality of winding rollers rotate according to movement of the primary transfer belt 61 by the secondary transfer counter roller 62.

The plurality of primary transfer rollers 63 are configured to bring the primary transfer belt 61 into contact with the photoreceptor drums 51 of the plurality of process units 42, respectively. The plurality of primary transfer rollers 63 are provided so as to correspond to the photoreceptor drums 51 of the plurality of process units 42. Specifically, the plurality of primary transfer rollers 63 are provided at positions facing the photoreceptor drums 51 of the corresponding process units 42, respectively, with the primary transfer belt 61 interposed therebetween. The primary transfer roller 63 comes into contact with the inner peripheral surface side of the primary transfer belt 61, and displaces the primary transfer belt 61 toward the photoreceptor drum 51. With this configuration, the primary transfer roller 63 brings the outer peripheral surface of the primary transfer belt 61 into contact with the photoreceptor drum 51.

The secondary transfer roller 64 is provided at a position facing the primary transfer belt 61. The secondary transfer roller 64 comes into contact with the outer peripheral surface of the primary transfer belt 61 and applies pressure thereto. With this configuration, a transfer nip in which the secondary transfer roller 64 and the outer peripheral surface of the primary transfer belt 61 are in close contact with each other is formed. When the recording medium passes through the transfer nip, the secondary transfer roller 64 presses the recording medium passing through the transfer nip against the outer peripheral surface of the primary transfer belt 61.

The secondary transfer roller 64 and the secondary transfer counter roller 62 rotate to convey the recording medium supplied from the paper feed cassette 16 by a conveyance mechanism 65 in a state of pinching the recording medium. With this configuration, the recording medium passes through the transfer nip.

In the configuration described above, when the outer peripheral surface of the primary transfer belt 61 comes into contact with the photoreceptor drum 51, the toner image formed on the surface of the photoreceptor drum 51 is transferred to the outer peripheral surface of the primary transfer belt 61. When the image forming unit 19 includes the plurality of process units 42, the primary transfer belt 61 receives a toner image from the photoreceptor drums 51 of the plurality of process units 42. The toner image transferred to the outer peripheral surface of the primary transfer belt 61 is conveyed by the primary transfer belt 61 to the transfer nip in which the secondary transfer roller 64 and the outer peripheral surface of the primary transfer belt 61 are in close contact with each other. When a recording medium is present in the transfer nip, the toner image transferred to the outer peripheral surface of the primary transfer belt 61 is transferred to the recording medium in the transfer nip.

Next, a plurality of photodetectors 45 will be described.

Figure 2:
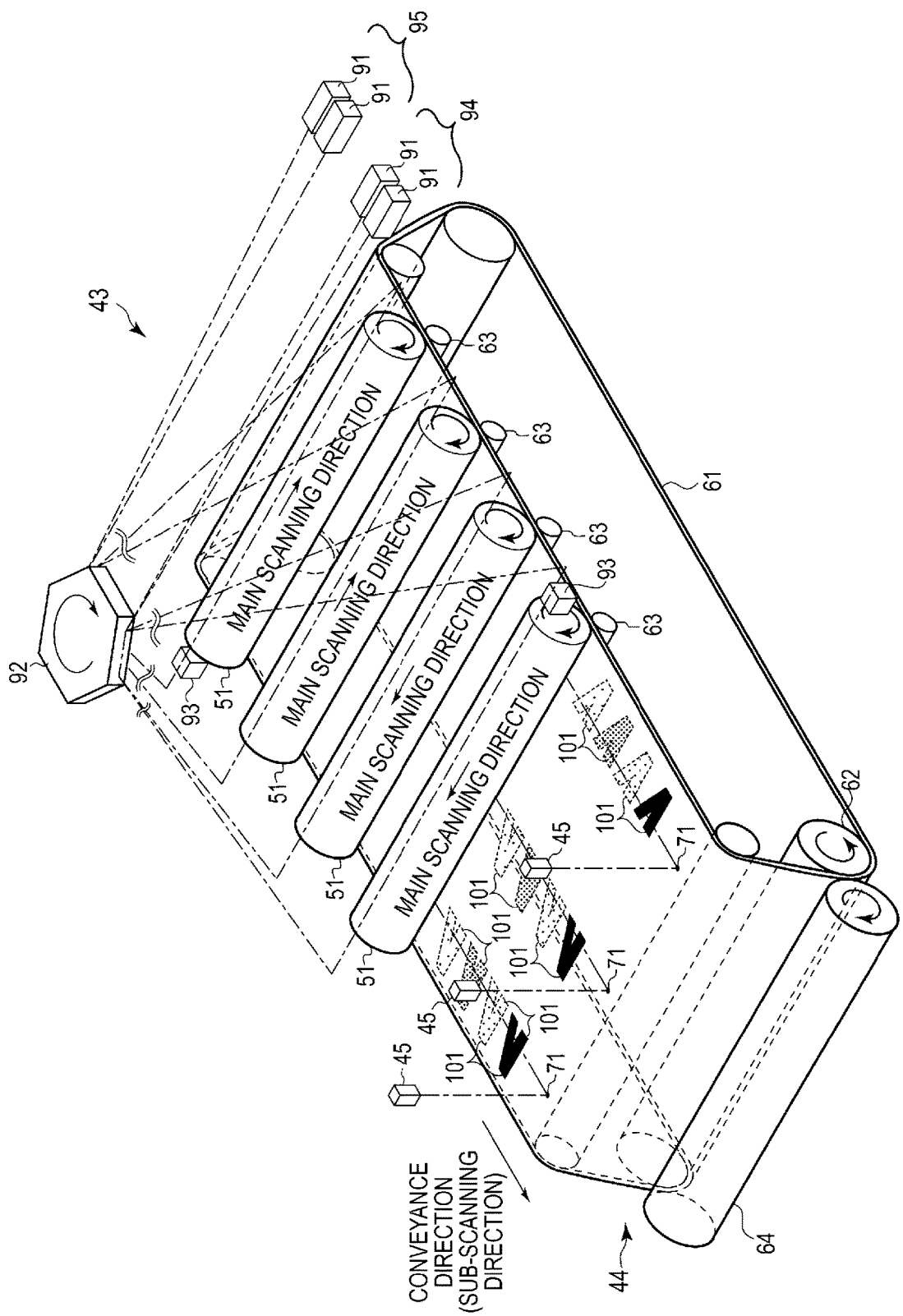
FIG. 2 is a diagram for illustrating a configuration example of an exposure device and a transfer mechanism of the image forming apparatus according to at least one embodiment.

FIG. 2 is an explanatory diagram for illustrating an example of a configuration of a part of the process unit 42 and the periphery of the transfer mechanism 44 of the image forming unit 19. FIG. 2 is a perspective view of the transfer mechanism 44 of the image forming unit 19 as viewed from the exposure device 43 and the photoreceptor drum 51 side.

Each of the plurality of photodetectors 45 includes a sensor that outputs an electric signal according to the irradiated light and an optical system that makes light incident on the sensor. Each of the plurality of photodetectors 45 converts light incident on the sensor from detection positions 71 via the optical system into an electric signal and outputs the electric signal to the system controller 13.

The plurality of photodetectors 45 are disposed so as to detect one point on the outer peripheral surface of the primary transfer belt 61, respectively. Each of the plurality of photodetectors 45 detects the presence or absence of a toner image at the detection positions 71. For example, as illustrated in FIG. 2, the plurality of photodetectors 45 are arranged so that the detection positions 71 are arranged in a direction parallel to the main scanning direction and at different positions in the main scanning direction.

Next, a configuration related to fixing of the image forming apparatus 1 will be described.

The fixing device 20 melts the toner transferred to the recording medium and fixes the toner image. The fixing device 20 operates under the control of the system controller 13. The fixing device 20 includes a heating member that applies heat to the recording medium and a pressurizing member that applies pressure to the recording medium. For example, the heating member is a heat roller 81. For example, the pressurizing member is a press roller 82.

The heat roller 81 is a rotating body for fixing. The heat roller 81 includes a core metal formed of metal in a hollow shape and an elastic layer formed on the outer periphery of the core metal. The heat roller 81 is heated to a high temperature by a heater disposed inside the core metal formed in a hollow shape. The heater is, for example, a halogen heater. The heater may be an induction heating (IH) heater that heats the core metal by electromagnetic induction.

The press roller 82 is provided at a position facing the heat roller 81. The press roller 82 includes a core metal formed of metal having a predetermined outer diameter, and an elastic layer formed on the outer periphery of the core metal. The press roller 82 applies pressure to the heat roller 81. By applying pressure from the press roller 82 to the heat roller 81, a fixing nip in which the press roller 82 and the heat roller 81 are in close contact with each other is formed. The press roller 82 rotates to move the recording medium that entered the fixing nip and presses the recording medium against the heat roller 81.

With the configuration described above, the heat roller 81 and the press roller 82 apply heat and pressure to the recording medium passing through the fixing nip. With this configuration, the toner image is fixed on the recording medium that passes through the fixing nip. The recording medium that passed through the fixing nip is discharged to the outside of the casing 11 by the conveyance mechanism 18. The fixing device 20 is not limited to the configuration described above. The fixing device 20 may be configured with an on-demand method in which heat is applied to a recording medium on which a toner image is transferred via a film-like member to melt and fix the toner.

Next, the configuration of the exposure device 43 will be described in detail.

FIG. 2 is an explanatory diagram for describing a positional relationship of the exposure device 43 with respect to the photoreceptor drum 51. In at least one embodiment, the exposure device 43 will be described as having a configuration in which the exposure device 43 corresponds to laser scanning unit (LSU) and optical members for scanning are disposed on both sides of a polygon mirror as a center. In the example of FIG. 2, the plurality of process units 42 are disposed in an order of yellow, magenta, cyan, and black in order distant from the transfer nip.

As illustrated in FIG. 2, the exposure device 43 includes a plurality of laser light sources 91, a polygon mirror 92, a plurality of optical members, and a plurality of photodetectors 93.

The laser light source 91 is a light source that outputs a laser beam. The laser light source 91 is, for example, a laser diode. The laser light source 91 is provided for each process unit 42, for example. That is, the laser light source 91 is provided for each color such as cyan, magenta, yellow, and black.

The polygon mirror 92 is a rotating multifaceted mirror that has a plurality of reflecting surfaces that reflect the laser beam output from the laser light source 91 and rotates at a constant speed. The reflecting surface is provided so that an angle of the laser beam with respect to an incident direction changes according to the rotation of the polygon mirror 92. The polygon mirror 92 changes the advancing direction of the laser beam with time by reflecting the laser beam output from each laser light source 91 by the reflecting surface while rotating at a constant speed by a drive mechanism. With this configuration, the polygon mirror 92 polarizes and scans the laser beam output from each laser light source 91 in the main scanning direction on the photoreceptor drum 51 of each process unit 42.

The optical member is a light guide member that causes the laser beam reflected by the reflecting surface of the polygon mirror 92 to be incident on the photoreceptor drum 51. The optical member is, for example, a reflecting mirror and a scanning lens provided for each process unit 42. That is, the optical member is provided for each color such as cyan, magenta, yellow, and black.

The optical member corresponding to cyan causes the laser beam, which is output from the laser light source 91 corresponding to cyan and reflected by the polygon mirror 92, to be incident on the photoreceptor drum 51 of the process unit 42 corresponding to cyan. The optical member corresponding to magenta causes the laser beam, which is output from the laser light source 91 corresponding to magenta and reflected by the polygon mirror 92, to be incident on the photoreceptor drum 51 of the process unit 42 corresponding to magenta. The optical member corresponding to yellow causes the laser beam, which is output from the laser light source 91 corresponding to yellow and reflected by the polygon mirror 92, to be incident on the photoreceptor drum 51 of the process unit 42 corresponding to yellow. The optical member corresponding to black causes the laser beam, which is output from the laser light source 91 corresponding to black and reflected by the polygon mirror 92, to be incident on the photoreceptor drum 51 of the process unit 42 corresponding to black.

The photodetector 93 is a beam detector that detects the laser beam output from the laser light source 91 and reflected by the polygon mirror 92. The photodetector 93 is also referred to as a BD (beam detection) sensor. The photodetector 93 includes, for example, a photodiode, a phototransistor, or other elements that generate an electrical signal in response to light. When the photodetector 93 detects the laser beam, the photodetector 93 outputs a beam detect signal (BD signal).

The photodetector 93 is disposed on an optical path of the laser beam reflected by the polygon mirror 92. The photodetector 93 is disposed, for example, at a position on the photoreceptor drum 51 where the focal position thereof is substantially equal to the extension line in the main scanning direction. That is, the photodetector detects the laser beam at a position substantially optically equal to the extension line in the main scanning direction on the photoreceptor drum 51.

The plurality of laser light sources 91, the plurality of optical members, and the plurality of photodetectors 93 are classified into a first system 94 and a second system 95. For example, the laser light sources 91, the optical members, and the photodetectors 93 corresponding to black and cyan are classified into the first system 94. For example, the laser light sources 91, the optical members, and the photodetectors 93 corresponding to magenta and yellow are classified into the second system 95. At least one photodetector 93 is provided for each system. That is, the photodetector 93 is provided in each of the first system 94 and the second system 95.

In this case, the first system 94 includes the laser light source 91 corresponding to cyan, the optical member corresponding to cyan, the laser light source 91 corresponding to black, the optical member corresponding to black, and the photodetector 93. The photodetector 93 of the first system 94 is provided at a position where the laser beam, which is output from the laser light source 91 corresponding to black and is deflected and scanned by a polygon mirror 92, is incident.

The second system 95 includes the laser light source 91 corresponding to yellow, the optical member corresponding to yellow, the laser light source 91 corresponding to magenta, the optical member corresponding to magenta, and the photodetector 93. The photodetector 93 of the second system 95 is provided at a position where the laser beam, which is output from the laser light source 91 corresponding to yellow and is deflected and scanned by the polygon mirror 92, is incident.

Any combination classified into the first system 94 and the second system 95 may be used. For example, each part may be disposed so that the first system 94 corresponds to one color and the second system 95 corresponds to three colors.

Next, the operation of the exposure device 43 will be described.

In the configuration described above, the processor 21 of the system controller 13 inputs image data for printing to the exposure device 43. The image data is data indicating the density of each color.

The exposure device 43 converts the image data into a drive signal of the laser light source 91 for each color such as cyan, magenta, yellow, and black, and inputs the image data to each laser light source 91. With this configuration, the laser beam is output from the laser light source 91.

The laser beam output from each laser light source 91 is reflected by the reflecting surface of the rotating polygon mirror 92. Therefore, the advancing direction of the laser beam incident on the polygon mirror 92 changes as the polygon mirror 92 rotates. The laser beam reflected by the polygon mirror 92 is deflected and scanned along the main scanning direction of the corresponding photoreceptor drum 51 via the optical member. That is, the laser beam output from the laser light source 91 is irradiated along the main scanning direction over the entire area on the corresponding photoreceptor drum 51.

The photodetector 93 detects the laser beam reflected by the polygon mirror 92 and outputs a BD signal to the system controller 13.

The processor 21 of the system controller 13 generates a synchronization signal. The synchronization signal is, for example, a main scanning counter that serves as a reference for the timing of operation for each system. The processor 21 determines an image data area on the main scanning counter based on the BD signal. For example, the processor 21 determines a predetermined position on the main scanning counter, that is, a predetermined count range of the main scanning counter as the image data area.

The image data area is an area for forming an electrostatic latent image based on the image data on the photoreceptor drum 51. The image data area indicates an exposure start position and an exposure end position. The exposure start position indicates the timing at which irradiation of the laser beam based on the image data is started. Specifically, the exposure start position indicates a count value of the main scanning counter for starting the irradiation of the laser beam based on the image data. The exposure end position indicates the timing at which the irradiation of the laser beam based on the image data is ended. Specifically, the exposure end position indicates a count value of the main scanning counter for ending the irradiation of the laser beam based on the image data. A distance between the exposure start position and the exposure end position is determined by a paper size of the recording medium to be printed.

The processor 21 also resets the main scanning counter based on the BD signal. That is, the processor 21 resets the main scanning counter at the timing when the BD signal is input from the photodetector 93. With this configuration, the timing at which the main scanning counter is "0" is determined, and the exposure start position and the exposure end position in the next line are also determined.

For example, the processor 21 determines the exposure start position and the exposure end position of the laser light source 91 of the first system 94 based on the timing at which the BD signal is input from the photodetector 93 of the first system 94. For example, the processor 21 determines the exposure start position and the exposure end position of the laser light source 91 of the second system 95 based on the timing at which the BD signal is input from the photodetector 93 of the second system 95.

The processor 21 controls the exposure device 43 so that the laser beam corresponding to the image data is output from the laser light source 91 from the exposure start position to the exposure end position. For example, the processor 21 inputs one line of image data into the exposure device 43 from the exposure start position to the exposure end position to execute exposure. With this configuration, the laser beam corresponding to the image data is output from each laser light source 91 from the exposure start position to the exposure end position. As a result, the laser beam reflected by the polygon mirror 92 is deflected and scanned on each photoreceptor drum 51 in the main scanning direction, and an electrostatic latent image is formed on each photoreceptor drum 51.

The processor 21 controls the exposure device 43 so that the laser beam is continuously output from the laser light source 91 from the exposure end position to the next exposure start position. With this configuration, the laser beam is incident on the photodetector 93 between the exposure end position and the exposure start position, and the BD signal is input from the photodetector 93 to the system controller 13.

The processor 21 resets the main scanning counter each time the BD signal is input from the photodetector 93 of each system. With this configuration, the processor 21 determines the exposure start position and the exposure end position for each line, and inputs the image data for each line to the exposure device 43.

Next, a relationship between a heat capacity of the recording medium and a printing speed will be described.

Since the time required for fixing differs depending on a heat capacity of the recording medium, the system controller 13 forms an image at a different printing speed depending on the recording medium. For that reason, the system controller 13 changes the speed of conveying the recording medium, the moving speed of the primary transfer belt 61, the rotation speed of the photoreceptor drum 51, and the rotation speed of the polygon mirror 92 according to the printing speed.

The printing speed includes, for example, first speed printing and second speed printing which is slower than the first speed printing. In at least one embodiment, the first speed printing is referred to as normal speed printing. The second speed printing is referred to as deceleration printing. The normal speed printing is printing at "normal speed" where the printing speed is a normal speed (a first speed).

The deceleration printing is printing at a "deceleration" where the printing speed is slower than the normal speed (e.g., when the printing speed is a second speed which is less than the first speed). The image forming apparatus 1 may be configured to have a larger number of printing speed settings.

The processor of the system controller 13 switches between the normal speed printing and the deceleration printing based on the type of recording medium used for printing, contents of the print job, settings based on operation input, default settings, and the like.

The system controller 13 controls the rotation speed of the polygon mirror 92 at the "normal speed" or the "deceleration" (a decelerated speed) slower than the normal speed. The system controller 13 controls the rotation speed of the photoreceptor drum 51 at the "normal speed" or the "deceleration" slower than the normal speed. The system controller 13 controls the conveyance speed of the recording medium by the conveyance mechanism 18 at the "normal speed" or the "deceleration" slower than the normal speed. The system controller 13 controls the moving speed of the primary transfer belt 61 at the "normal speed" or the "deceleration" slower than the normal speed.

When performing the normal speed printing, the processor 21 controls the rotation speed of the polygon mirror 92, the rotation speed of the photoreceptor drum 51, the conveyance speed of the recording medium by the conveyance mechanism 18, and the moving speed of the primary transfer belt 61 at the normal speed, respectively.

When performing the deceleration printing, the processor 21 controls the rotation speed of the polygon mirror 92, the rotation speed of the photoreceptor drum 51, the conveyance speed of the recording medium by the conveyance mechanism 18, and the moving speed of the primary transfer belt 61 at the deceleration, respectively.

As described above, when the rotation speed of the photoreceptor drum 51 and the polygon mirror 92 becomes slow (e.g., a second rotation speed of the photoreceptor drum 51 and a second rotation speed of the polygon mirror 92), the speed at which the laser beam is scanned on the photoreceptor drum 51 becomes slow (e.g., the second speed), and the time for scanning a unit scanning length becomes long (e.g., a second scan time which is longer than a first scan time, the first scan time being associated with the normal speed). For example, when laser power of the laser beam from the exposure device 43 is the same and the time for scanning the unit scanning length on the photoreceptor drum 51 with the laser beam is long, the density of the toner image formed on the recording medium becomes high.

Therefore, when the printing speed is the "normal speed" and the rotation speed of the polygon mirror 92 and the rotation speed of the photoreceptor drum 51 are the normal speed, the processor 21 of the system controller 13 controls the exposure device 43 so as to output the laser beam with first laser power. That is, when the printing speed is the "normal speed", the processor 21 sets a set value of laser power to the first laser power.

When the printing speed of the processor 21 of the system controller 13 is "deceleration" (a decelerated speed) and the rotation speed of the polygon mirror 92 and the rotation speed of the photoreceptor drum 51 are in deceleration, the processor 21 of the system controller 13 controls the exposure device 43 so as to output the laser beam with second laser power weaker than the first laser power. That is, when the printing speed is "deceleration", the processor 21 sets the set value of laser power to the second laser power.

Next, image quality stabilization processing will be described.

The processor 21 forms a test pattern with toner in order to maintain image quality, and causes the plurality of photodetectors 45 to detect the formed test pattern. The processor 21 performs image quality stabilization processing for determining a correction parameter in the image formation processing based on the detection results of the plurality of photodetectors 45.

As illustrated in FIG. 2, the processor 21 controls the image forming unit 19 so as to form a test pattern 101 on the primary transfer belt 61 by each process unit 42. That is, the processor 21 controls the image forming unit 19 so as to form the test pattern 101 for each color by each process unit 42.

The test pattern 101 is a toner image formed at a position, which is detectable by any of the plurality of photodetectors 45, on the primary transfer belt 61 in the main scanning direction. That is, the test pattern 101 is formed at a position that passes through any of the detection positions 71.

The tip of the test pattern 101 for each color in a sub-scanning direction is formed by the plurality of process units 42 at the same timing. That is, the tip of the test pattern 101 in the sub-scanning direction is formed based on an electrostatic latent image of one line formed on the photoreceptor drum 51 when the laser beam output from each laser light source 91 at the same timing is incident on the photoreceptor drum 51. That is, the test pattern 101 has a side orthogonal to the sub-scanning direction and parallel to the main scanning direction. The side of the test pattern 101 orthogonal to the sub-scanning direction and parallel to the main scanning direction is referred to as a first side.

As illustrated in FIG. 2, the test pattern 101 has a portion where a formation position of the toner image changes in the sub-scanning direction according to the position in the main scanning direction. That is, the test pattern 101 has a side that forms an angle in the main scanning direction and the sub-scanning direction. The side of the test pattern 101 forming an angle in the main scanning direction and the sub-scanning direction is referred to as a second side.

A gap in which the toner image is not formed exists between the first side and the second side.

In the test pattern 101 formed as described above, deviation of a printing position for each color in the sub-scanning direction and deviation of the printing position for each color in the main scanning direction are reflected.

When the first side of the test pattern 101 having such a shape reaches the detection position 71 of the photodetector 45, the photodetector 45 detects the first side of the test pattern 101 and the detection result is turned ON.

Next, when the gap between the first side and the second side of the test pattern 101 reaches the detection position 71 of the photodetector 45, the detection result of the photodetector 45 is turned OFF.

Next, when the second side of the test pattern 101 reaches the detection position 71 of the photodetector 45, the photodetector 45 detects the second side of the test pattern 101 and the detection result is turned ON again.

In this case, the time interval between the timing at which the first side of the test pattern 101 is detected, that is, the timing at which the detection result is first turned ON and the timing at which the second side of the test pattern 101 is detected, that is, the timing at which the detection result is turned ON next, changes according to the position of the test pattern 101 in the main scanning direction.

The processor 21 detects the test patterns 101 by the plurality of photodetectors 45, respectively, and acquires the detection results. For example, the processor 21 acquires the detection result obtained by detecting the test pattern 101 formed by the laser beam by the photodetector 45 based on the timing at which the laser beam from the laser light source 91 of the first system 94 is detected by the photodetector 93. The processor 21 acquires the detection result obtained by detecting the test pattern 101 formed by the laser beam by the photodetector 45 based on the timing at which the laser beam from the laser light source 91 of the second system 95 is detected by the photodetector 93. Based on the difference between these detection results, the processor 21 performs registration that generates a correction parameter for adjusting the position where the toner image is formed. That is, the processor 21 sets the correction parameter so as to reduce the deviation of the printing position for each color in the main scanning direction and the deviation of the printing position for each color in the sub-scanning direction. The processor 21 determines a transposition (e.g., determines a shift to be made) of at least one of the exposure start position of laser beam with respect to the photoreceptor drum 51 corresponding to the first system 94 or the exposure start position of laser beam with respect to the photoreceptor drum 51 corresponding to the second system 95 by the correction parameter.

For example, the processor 21 is configured as a counter for counting time intervals. The processor 21 generates a sub-scanning direction correction parameter for each color based on a count value of the time interval at the timing when the first side of the test pattern 101 for each color is detected by one photodetector 45 and a preset first reference value. The first reference value is determined by a mounting position of each process unit 42 and the like. That is, the processor 21 determines how much the time interval of timing at which the first side of the test pattern 101 for each color is detected deviates from the first reference value according to the mounting position of each process unit 42, and generates the sub-scanning direction correction parameter.

The sub-scanning direction correction parameter is information indicating how much the printing position of the other color is shifted in the sub-scanning direction when any color is used as a reference. For example, the sub-scanning direction correction parameter indicates the number of lines for shifting the position where the toner image for one line is formed in the sub-scanning direction for each color, that is, for each laser light source 91 and process unit 42.

The processor 21 generates a main scanning direction correction parameter for each color based on a count value of the time interval between the timing at which the first side of the test pattern 101 is detected by the photodetector 45 and the timing at which the second side of the test pattern 101 is detected by the photodetector 45 and a preset second reference value. The second reference value is a count value of the time interval between the timing at which the first side of the test pattern 101 is detected and the timing at which the second side of the test pattern 101 is detected when the test pattern 101 is formed at a reference position. The processor 21 calculates the difference between the count value of the time interval between the timing at which the first side of the test pattern 101 is detected and the timing at which the second side of the test pattern 101 is detected and the second reference value. Based on the calculated difference, the processor 21 determines how much the test pattern 101 deviates from the main scanning direction, and generates the main scanning direction correction parameter. The processor 21 calculates the difference from the second reference value for each color, and generates the main scanning direction correction parameter for each color.

The main scanning direction correction parameter is information indicating how much the printing position for each color is shifted in the main scanning direction. That is, the main scanning direction correction parameter is information indicating an amount for shifting the exposure start position and the exposure end position for each of the laser light source 91 and the process unit 42. The main scanning direction correction parameter indicates, for example, an amount for shifting the exposure start position and the exposure end position as a counter value of the main scanning counter.

The processor 21 controls the timing at which the exposure device 43 starts irradiating the photoreceptor drum 51 of each process unit 42 with laser beam based on the generated sub-scanning direction correction parameter and the main scanning direction correction parameter. That is, the processor 21 controls the position where the toner image is formed on the primary transfer belt 61 by each process unit 42 based on the generated sub-scanning direction correction parameter and main scanning direction correction parameter.

For example, the processor 21 shifts a printing start timing, which is determined from the timing at which the recording medium to be printed reaches the fixing nip, in the sub-scanning direction based on the sub-scanning direction correction parameter. For example, the processor 21 shifts the exposure start position and the exposure end position determined from the size of the recording medium to be printed, that is, the print size, in the main scanning direction based on the main scanning direction correction parameter. With this configuration, the processor 21 can shift the position of the toner image formed on the primary transfer belt 61 in the main scanning direction and the sub-scanning direction.

As described above, when the printing speed is the normal speed, the processor 21 controls the exposure device 43 so as to output the laser beam with the first laser power. When the printing speed is in deceleration, the processor 21 controls the exposure device 43 so as to output the laser beam with the second laser power weaker than the first laser power. When the laser power of the laser beam output from the exposure device 43 changes, the time from when the laser beam is incident on the photodetector 93 until the light detector 93 outputs the BD signal indicating that the laser beam is detected changes.

In at least one embodiment, the processor 21 performs BD signal correction processing for correcting the timing of processing based on the BD signal. With this configuration, the processor 21 corrects the timing at which the BD signal is output from the photodetector 93 due to the change in the laser power. Specifically, the processor 21 calculates a BD signal correction parameter based on the timing at which the BD signal is output from the photodetector 93 of the first system 94 and the second system 95 while changing the laser power of the laser light sources 91 of the first system 94 and the second system 95. The BD signal correction parameter is information for correcting the output timing of the BD signal that changes according to the change in the laser power. That is, the BD signal correction parameter indicates how much the timing at which the BD signal is output shifts according to the change in the laser power. With this configuration, the processor 21 corrects the position of the image in the main scanning direction.

In the first system 94 and the second system 95, the laser beam is scanned on the photoreceptor drum 51 in opposite directions to each other. In the first system 94, the laser beam is scanned on the photoreceptor drum 51 in a first direction along the main scanning direction. In the second system 95, the laser beam is scanned on the photoreceptor drum 51 in a second direction along the main scanning direction and opposite to the first direction. The processor 21 generally uses a specific color (for example, black) among four colors as a reference, sets the position of the image with the reference color, and corrects a color shift with respect to the reference color. Although a correction amount needs to be sufficiently secured, the processor 21 fixes any color (usually the reference color) to correct the color shift. When the correction amount is large or when the target is two colors, the processor 21 may correct (shift) the exposure start positions in opposite directions to each other.

The processor 21 performs registration of image quality stabilization processing based on the fastest printing speed among the plurality of printing speeds that can be set in the image forming apparatus 1, and generates the main scanning direction correction parameter and the sub-scanning direction correction parameter. Furthermore, the processor 21 calculates the BD signal correction parameters for other printing speeds that can be set in the image forming apparatus 1. With this configuration, the processor 21 corrects the position of the image in the main scanning direction based on the BD signal correction parameters, at other printing speeds that can be set in the image forming apparatus 1.

Next, an example of the operation of the image forming apparatus 1 including registration of image quality stabilization processing and BD signal correction processing will be described.

Figure 3:
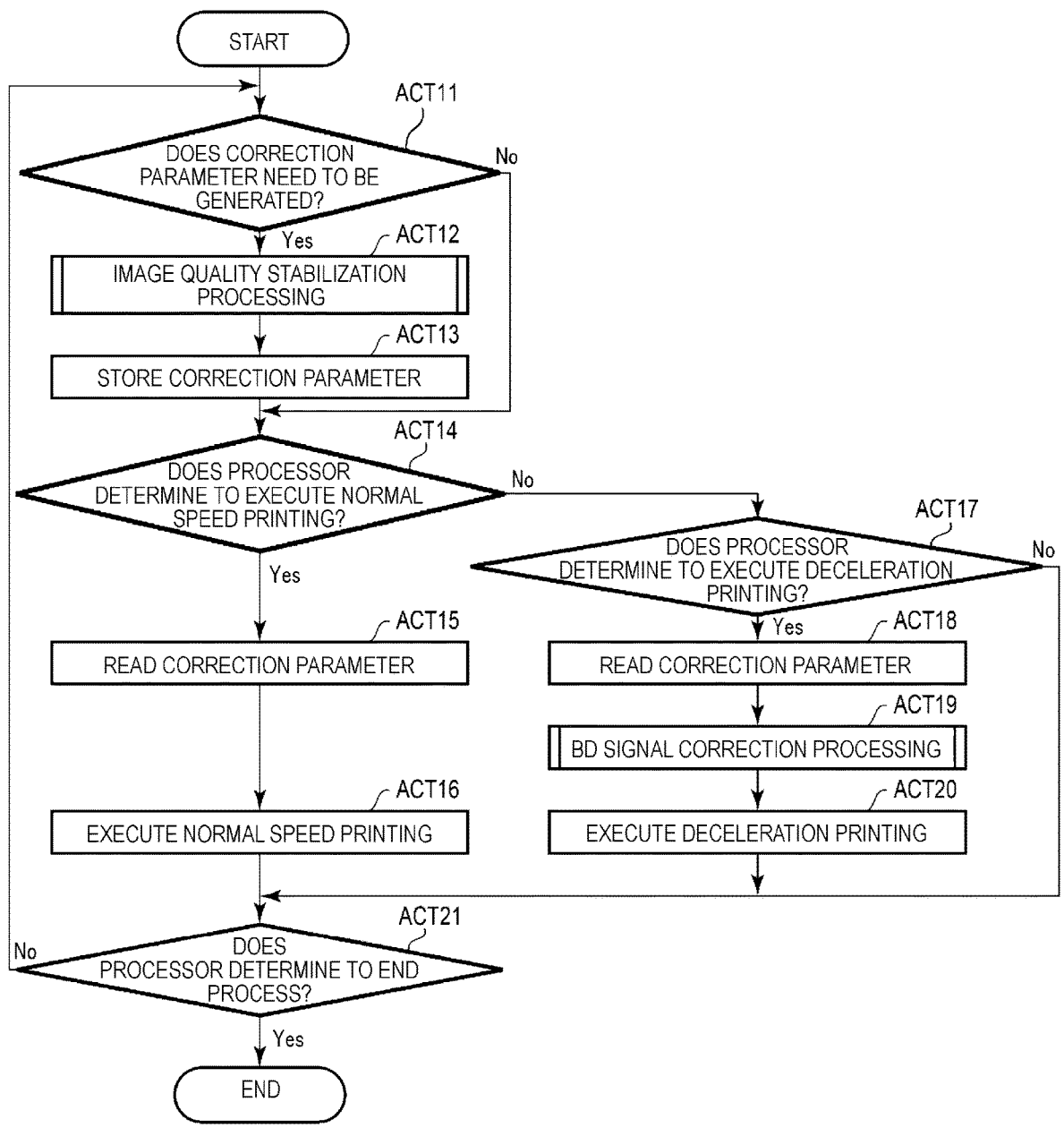
FIG. 3 is a flowchart for illustrating an example of an operation of the image forming apparatus according to at least one embodiment.

FIG. 3 is a flowchart for illustrating an example of the operation of the image forming apparatus 1.

The processor 21 determines whether or not a correction parameter needs to be generated, that is, registration needs to be performed (ACT 11). For example, processor 21 determines to perform the registration at startup of the image forming apparatus 1. The processor 21 may determine to perform the registration again when the environment such as temperature and humidity changes since the last registration. For example, the processor 21 acquires environmental information from a sensor that detects temperature, humidity, and the like, and records the acquired environmental information in the memory 22 together with the correction parameter. The processor 21 compares current environmental information with the environmental information recorded in the memory 22 together with the correction parameter. The processor 21 determines, based on the comparison result, whether or not to perform the registration again.

That is, the processor 21 generates the main scanning direction correction parameter and the sub-scanning direction correction parameter at startup, and records the environmental information. If the environmental information recorded when the main scanning direction correction parameter and the sub-scanning direction correction parameter were generated and the current environmental information are different from each other, the processor 21 determines to generate the main scanning direction correction parameter and the sub-scanning direction correction parameter again.

When the processor 21 determines that the correction parameter does not need to be generated (NO in ACT 11), the processor 21 proceeds to processing of ACT 14 described later.

When the processor 21 determines that the correction parameter needs to be generated (YES in ACT 11), the processor 21 performs the image quality stabilization processing (ACT 12).

The processor 21 stores the generated correction parameter in the memory 22 (ACT 13).

In the image quality stabilization processing, the processor 21 first controls the image forming unit 19 so as to form the test pattern 101 at the normal speed and at the first laser power. That is, the processor 21 controls the rotation speed of the polygon mirror 92, the rotation speed of the photoreceptor drum 51, the conveyance speed of the recording medium by the conveyance mechanism 18, and the moving speed of the primary transfer belt 61 at the normal speeds, respectively, and controls the exposure device 43 so as to output the laser beam with the first laser power. With this configuration, the test pattern 101 for each color, that is, the test patterns 101 for four colors are formed on the primary transfer belt 61.

Next, the processor 21 detects the test pattern 101 by the photodetector 45.

The processor 21 generates the sub-scanning direction correction parameter based on the detection result of the test pattern 101 by the photodetector 45. As described above, the processor 21 generates the sub-scanning direction correction parameter for each color based on the time interval of the timing at which the first side of the test pattern 101 for each color is detected and the preset first reference value. The processor 21 generates the sub-scanning direction correction parameter with the test patterns for four colors arranged as one set. The processor 21 stores the generated sub-scanning direction correction parameter in the memory 22.

Next, the processor 21 generates the main scanning direction correction parameter based on the detection result of the test pattern 101. As described above, the processor 21 generates the main scanning direction correction parameter for each color based on the time interval between the timing at which the first side of the test pattern 101 is detected and the timing at which the second side of the test pattern 101 is detected and the preset second reference value. The processor 21 stores the generated main scanning direction correction parameter in the memory 22.

Next, the processor 21 determines whether or not to execute normal speed printing (ACT 14). The processor 21 determines whether or not to execute the normal speed printing based on the print job.

When the processor 21 determines to execute the normal speed printing (YES in ACT 14), the processor 21 reads the sub-scanning direction correction parameter and the main scanning direction correction parameter from the memory 22 (ACT 15).

The processor 21 executes the normal speed printing (ACT 16) based on the read sub-scanning direction correction parameter and the main scanning direction correction parameter, and proceeds to processing of ACT 21. That is, the processor 21 controls the timing at which the exposure device 43 starts irradiating the photoreceptor drum 51 of each process unit 42 with the laser beam based on the read sub-scanning direction correction parameter and the main scanning direction correction parameter. With this configuration, the processor 21 shifts the position of the toner image formed on the primary transfer belt 61 in the main scanning direction and the sub-scanning direction. As a result, positional deviation that occurs between different colors can be eliminated.

When the processor 21 determines not to execute the normal speed printing in ACT 14 (NO in ACT 14), the processor 21 determines whether or not to execute deceleration printing (ACT 17). The processor 21 determines whether or not to execute the deceleration printing based on the print job. When the processor 21 determines not to execute the deceleration printing (NO in ACT 17), the processor 21 proceeds to processing of ACT 21 described later.

When the processor 21 determines to execute the deceleration printing (YES in ACT 17), the processor 21 reads the sub-scanning direction correction parameter and the main scanning direction correction parameter from the memory 22 (ACT 18).

When executing the deceleration printing, the processor 21 performs BD signal correction processing (ACT 19). With this configuration, the processor 21 calculates the BD signal correction parameter, which is a correction parameter for correcting the timing of processing based on the BD signal during the deceleration printing.

Next, the processor 21 executes the deceleration printing (ACT 20) based on the read sub-scanning direction correction parameter and the main scanning direction correction parameter, and the BD signal correction parameter, and proceeds to processing of ACT 21. That is, the processor 21 determines the exposure start position and the exposure end position on the main scanning counter based on the read sub-scanning direction correction parameter and the main scanning direction correction parameter. The processor 21 shifts the timing of resetting the main scanning counter when the BD signal is input, based on the BD signal correction parameter. With this configuration, the processor 21 shifts the position of the toner image formed on the primary transfer belt 61 in the main scanning direction and the sub-scanning direction. As a result, the positional deviation that occurs between different colors can be eliminated.

The processor 21 determines whether or not to end the process (ACT 21). When the processor 21 determines not to end the process (NO in ACT 21), the processor 21 proceeds to processing of ACT 11. When the processor 21 determines to end the process (YES in ACT 21), the processor 21 ends the process of FIG. 3.

Next, an example of calculating the BD signal correction parameter will be described.

FIG. 4 is a flowchart for illustrating an example of BD signal correction processing in ACT 19 of FIG. 3.

A factor of deviation of the exposure start position in the main scanning direction is, for example, the influence of laser power of the laser beam incident on the photodetector 93. The laser power of the laser beam changes depending on the printing speed as described above. The laser power of the laser beam is increased with the lapse of the use time of the photoreceptor drum 51. The laser power of the laser beam is increased or decreased depending on the environmental conditions of the image forming apparatus 1, that is, temperature and humidity.

For example, the time interval between the BD signal from the photodetector 93 of the first system 94 when the first system 94 is operated with the first laser power and the BD signal from the photodetector 93 of the second system 95 when the second system 95 is operated with the second laser power is set as a first counter value (e.g., a first time interval defines a time interval between the laser beam detection by the first photodetector and the laser beam detection by the second photodetector when the first laser light source has the first laser power and the second laser light source has the second laser power). The time interval between the BD signal from the photodetector 93 of the first system 94 and the BD signal from the photodetector 93 of the second system 95 when both the first system 94 and the second system 95 are operated with the first laser power is set as a third counter value. In this case, the first counter value less the third counter value becomes an amount of deviation in the second system 95.

The time interval between the BD signal from the photodetector 93 of the first system 94 when the first system 94 is operated by the second laser power and the BD signal from the photodetector 93 of the second system 95 when the second system 95 is operated by the first laser power is set as a second counter value (e.g., a second time interval defines a time interval between the laser beam detection by the first photodetector and the laser beam detection by the second photodetector when the first laser light source has the second laser power and the second laser light source has the first laser power). In this case, the second counter value less the third counter value becomes the amount of deviation in the first system 94.

As a result, the total amount of deviation becomes (first counter value−third counter value)−(second counter value−third counter value)=(first counter value−second counter value). That is, the difference between the first counter value and the second counter value indicates how much the exposure start position determined based on the BD signal deviates in the main scanning direction when laser power is controlled by the second laser power according to deceleration. In other words, the difference between the first counter value and the second counter value shows how much the exposure start position determined based on the BD signal deviates in the main scanning direction when both the first system 94 and the second system 95 are operated with the second laser power, as compared with the case where the exposure start position is operated with the second laser power.

The processor 21 corrects deviation of the exposure start position caused by change in the laser power by the following processing.

First, the processor 21 controls the exposure device 43 so that the rotation speed of the polygon mirror 92 becomes the normal speed when performing the BD signal correction processing (ACT 31).

The processor 21 controls the exposure device 43 so as to drive the laser light source 91 of the first system 94 with the first laser power and the laser light source 91 of the second system 95 with the second laser power (ACT 32). As a result, the laser beam of the first laser power is incident on the photodetector 93 of the first system 94, and the photodetector 93 of the first system 94 outputs a first BD signal. The laser beam of the second laser power is incident on the photodetector 93 of the second system 95, and the photodetector 93 of the second system 95 outputs a second BD signal.

The processor 21 acquires the first BD signal from the photodetector 93 of the first system 94 and acquires the second BD signal from the photodetector 93 of the second system 95 (ACT 33).

The processor 21 calculates the first counter value from the first BD signal and the second BD signal (ACT 34). For example, the processor 21 counts the time interval between the timing at which the first BD signal is output from the photodetector 93 of the first system 94 and the timing at which the second BD signal is output from the photodetector 93 of the second system 95, and calculates the first counter value.

The processor 21 controls the exposure device 43 so as to drive the laser light source 91 of the first system 94 with the second laser power and the laser light source 91 of the second system 95 with the first laser power (ACT 35). As a result, the laser beam of the second laser power is incident on the photodetector 93 of the first system 94, and the photodetector 93 of the first system 94 outputs a third BD signal. The laser beam of the first laser power is incident on the photodetector 93 of the second system 95. The photodetector 93 of the second system 95 outputs a fourth BD signal.

The processor 21 acquires the third BD signal from the photodetector 93 of the first system 94 and the fourth BD signal from the photodetector 93 of the second system 95 (ACT 36).

The processor 21 calculates the second counter value from the third BD signal and the fourth BD signal (ACT 37).

The processor 21 calculates the BD signal correction parameter based on the difference between the first counter value and the second counter value (ACT 38). That is, the processor 21 calculates the BD signal correction parameter so that the deviation described above is eliminated.

When performing deceleration printing as illustrated in ACT 20 in FIG. 3, the processor 21 determines the exposure start position on the main scan counter based on the sub-scanning direction correction parameter and the main scanning direction correction parameter, and determines the timing for resetting the main scan counter based on the BD signal correction parameter. With this configuration, the processor 21 can control the image forming unit 19 so that the toner image is formed at the same position on the primary transfer belt 61 among the plurality of process units 42.

As described above, the processor 21 of the system controller 13 of the image forming apparatus 1 calculates and stores the main scanning direction correction parameter and the sub-scanning direction correction parameter based on the detection result of the test pattern 101. The processor 21 controls the exposure start position based on the main scanning direction correction parameter and the sub-scanning direction correction parameter during the normal speed printing.

The processor 21 acquires the BD signals from the photodetector 93 of the first system 94 and the photodetector 93 of the second system 95 while changing the laser power in the first system 94 and the second system 95, respectively, during the deceleration printing. The processor 21 calculates the BD signal correction parameter for correcting the output timing of the BD signal based on the difference in output timing of the BD signal from photodetector 93 of the first system 94 and photodetector 93 of the second system 95. The processor 21 performs the deceleration printing by controlling the exposure start position based on the main scanning direction correction parameter, the sub-scanning direction correction parameter, and the BD signal correction parameter.

For example, the processor 21 shifts the output timing of the laser beam from one of the laser light source 91 of the first system 94 and the laser light source 91 of the second system 95, with the output timing of the laser beam from the other of the laser light source 91 of the first system 94 and the laser light source 91 of the second system 95 in deceleration printing as a reference, based on the difference between the first counter value and the second counter value. That is, the processor 21 shifts at least one of the position (e.g., the exposure start position of laser beam to the photoconductor drum 51 corresponding to the first system 94) where the electrostatic latent image is formed on the photoconductor drum 51 corresponding to the first system 94 and the position (e.g., the exposure start position of laser beam to the photoconductor drum 51 corresponding to the second system 95) where the electrostatic latent image is formed on the photoconductor drum 51 corresponding to the second system 95 in the main scanning direction, in deceleration printing.

The calculation of the BD signal correction parameter can be performed by outputting the laser beam from the laser light source 91 and detecting the laser beam by the photodetector 93 without forming the toner image. For that reason, the image forming apparatus 1 can perform the BD signal correction processing in a very short time as compared with the image stabilizing processing. As a result, the image forming apparatus 1 can perform the deceleration printing while suppressing color shift by performing the BD signal correction processing immediately before the start of scanning of the image data at the start of deceleration printing without generating the main scanning direction correction parameter and the sub-scanning direction correction parameter for each printing speed (e.g., for one or more printing speeds among a plurality of printing speeds).

In at least one embodiment described above, the processor 21 is described that the processor 21 controls the exposure device 43 so that the rotation speed of the polygon mirror 92 becomes a normal speed when performing the BD signal correction processing, but is not limited to this configuration. When the processor 21 controls the rotation speed of the polygon mirror 92 with deceleration to perform BD signal correction processing, the same result can be obtained by measuring the time interval with the deceleration as a reference.

The functions described in at least one embodiment described above are not only implemented by using hardware, but can also be realized by loading a program describing each function into a computer by using software. Each function may be configured by appropriately selecting either software or hardware.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
  a first photoreceptor and a second photoreceptor configured to rotate;
  a polygon mirror configured to rotate and reflect a laser beam;
  a first laser light source configured to output the laser beam on the polygon mirror in a first direction along a main scanning direction on the first photoreceptor to form a first electrostatic latent image;
  a second laser light source configured to reflect the laser beam on the polygon mirror in a second direction along the main scanning direction on the second photoreceptor to form a second electrostatic latent image, the second direction opposite to the first direction;
  a first developing device configured to form a toner image by adhering toner to the first electrostatic latent image;
  a second developing device configured to form a toner image by adhering the toner to the second electrostatic latent image;
  a transfer mechanism configured to transfer the toner images on the first photoreceptor and the second photoreceptor to an image carrier;
  a first photodetector configured to detect the laser beam output from the first laser light source and reflected by the polygon mirror;
  a second photodetector configured to detect the laser beam output from the second laser light source and reflected by the polygon mirror; and
  a controller configured to:
    switch between printing at a first speed and printing at a second speed, the printing at the first speed corresponding to a rotation speed of the polygon mirror being a first rotation speed and a power of the laser beam from the first and second laser light sources being a first laser power, and the printing at the second speed corresponding to the rotation speed of the polygon mirror being a second rotation speed slower than the first rotation speed and the power of the laser beam from the first and second laser light sources at a second laser power lower than the first laser power,
    determine an exposure start position of the laser beam to the first photoconductor based on a timing at which the laser beam is detected by the first photodetector;
    determine an exposure start position of the laser beam to the second photoconductor based on a timing at which the laser beam is detected by the second photodetector, and
    control an output timing of the laser beam from the first laser light source and the second laser light source in the printing at the second speed based on the timing at which the laser beam is detected by the first photodetector and the timing at which the laser beam is detected by the second photodetector responsive to changing of the laser powers of the first laser light source and the second laser light source, respectively.

2. The apparatus of claim 1, wherein
the controller is configured to
drive the first laser light source with the first laser power, drive the second laser light source with the second laser power, and calculate a first time interval, the first time interval defining a time interval between the laser beam detection by the first photodetector and the laser beam detection by the second photodetector,
drive the first laser light source with the second laser power, drive the second laser light source with the first laser power, and calculate a second time interval, the second time interval defining a time interval between the laser beam detection by the first photodetector and the laser beam detection by the second photodetector, and
shift, based on a difference between the first time interval and the second time interval, an output timing of the laser beam from the one of the first laser light source and the second laser light source with the output timing of the laser beam output from the other of the first laser light source and the second laser light source in the printing at the second speed.

3. The apparatus of claim 2, wherein
the controller is configured to
shift, based on the difference between the first time interval and the second time interval, at least one of a position where the first electrostatic latent image is formed or a position where the second electrostatic latent image is formed in the main scanning direction in the printing at the second speed.

4. The apparatus of claim 2, wherein the controller is configured to shift, based on the difference between the first time interval and the second time interval, a position where the first electrostatic latent image is formed and a position where the second electrostatic latent image is formed in opposite directions to each other in the main scanning direction in the printing at the second speed.

5. The apparatus of claim 2, wherein the controller is configured to calculate the difference between the first time interval and the second time interval before the printing at the second speed.

6. The apparatus of claim 5, wherein the controller is configured to shift, based on the difference between the first time interval and the second time interval, at least one of the exposure start position of the laser beam to the first photoconductor or the exposure start position of the laser beam to the second photoconductor in the printing at the second speed in the main scanning direction.

7. The apparatus of claim 6, further comprising: a third photodetector configured to detect the toner image formed on the image carrier, wherein the controller is configured to output the laser beam from the first laser light source and the second laser light source with the first laser power while rotating the polygon mirror at the first speed to form a test pattern on the image carrier, and control the printing at the first speed and the printing at the second speed based on a detection result of the test pattern by the third photodetector.

8. The apparatus of claim 7, wherein the controller is configured to determine at least one of the exposure start position of the laser beam to the first photoconductor or the exposure start position of the laser beam to the second photoconductor, based on a difference between the detection result of the test pattern formed by the laser beam, the timing at which the laser beam is detected by the first photodetector and the third photodetector, the detection result of the test pattern formed by the laser beam, and the timing at which the laser beam is detected by the second photodetector and the third photodetector.

9. The apparatus of claim 8 wherein the controller is configured to shift, based on the difference between the first time interval and the second time interval, at least one of the exposure start position of the laser beam to the first photoconductor or the exposure start position of the laser beam to the second photoconductor in the printing at the second speed in the main scanning direction.

10. An image forming apparatus comprising: a controller configured to:
switch between a printing at a first speed and printing at a second speed, the printing at the first speed corresponding to a rotation speed of a polygon mirror being a first rotation speed and a power of a laser beam from a first and second laser light sources being a first laser power, the printing at the second speed corresponding to the rotation speed of the polygon mirror being a second rotation speed slower than the first rotation speed and the power of the laser beam from the first and second laser light sources at a second laser power lower than the first laser power,
determine an exposure start position of the laser beam to a first photoconductor based on a timing at which the laser beam is detected by the first photodetector;
determine an exposure start position of the laser beam to a second photoconductor based on a timing at which the laser beam is detected by the second photodetector, and
control an output timing of the laser beam from the first laser light source and the second laser light source in the printing at the second speed based on the timing at which the laser beam is detected by the first photodetector and the timing at which the laser beam is detected by the second photodetector responsive to changing of the laser powers of the first laser light source and the second laser light source, respectively.

11. The apparatus of claim 10, wherein the controller is configured to
drive the first laser light source with the first laser power, drive the second laser light source with the second laser power, and calculate a first time interval, the first time interval defining a time interval between the laser beam detection by the first photodetector and the laser beam detection by the second photodetector,
drive the first laser light source with the second laser power, drive the second laser light source with the first laser power, and calculate a second time interval, the second time interval defining a time interval between the laser beam detection by the first photodetector and the laser beam detection by the second photodetector, and
shift, based on a difference between the first time interval and the second time interval, an output timing of the laser beam from the one of the first laser light source and the second laser light source with the output timing of the laser beam output from the other of the first laser light source and the second laser light source in the printing at the second speed.

12. The apparatus of claim 11, wherein the controller is configured to shift, based on the difference between the first time interval and the second time interval, at least one of a position where an electrostatic latent image is formed on the first photoconductor and a position where an electrostatic latent image is formed on the second photoconductor in a main scanning direction in the printing at the second speed.

13. The apparatus of claim 11, wherein the controller is configured to shift, based on the difference between the first time interval and the second time interval, a position where an electrostatic latent image is formed on the first photoconductor and a position where an electrostatic latent image is formed on the second photoconductor in opposite directions to each other in a main scanning direction in the printing at the second speed.

14. A method of operating an image forming apparatus, the method comprising:
rotating a first photoreceptor and a second photoreceptor;
rotating a polygon mirror configured to reflect a laser beam;
forming a first electrostatic latent image via an output of the laser beam on the polygon mirror in a first direction along a main scanning direction on the first photoreceptor;
forming a second electrostatic latent image via a reflection of the laser beam on the polygon mirror in a second direction along the main scanning direction on the second photoreceptor, the second direction opposite to the first direction;

forming a toner image by adhering toner to the first electrostatic latent image;

forming a toner image by adhering the toner to the second electrostatic latent image;

transferring the toner images on the first photoreceptor and the second photoreceptor to an image carrier;

detecting the laser beam output and reflection by the polygon mirror; and switching between printing at a first speed and printing at a second speed, the printing at the first speed corresponding to a rotation speed of the polygon mirror being a first rotation speed and a power of the laser beam being a first laser power, the printing at the second speed corresponding to the rotation speed of the polygon mirror being a second rotation speed less than the first speed and the power of the laser beam at a second laser power lower than the first laser power, determining an exposure start position of the laser beam to the first photoconductor based on a timing at which the laser beam is detected by the first photodetector;

determining an exposure start position of the laser beam to the second photoconductor based on a timing at which the laser beam is detected by the second photodetector, and controlling an output timing of the laser beam in the printing at the second speed based on the timing at which the laser beam is detected by the first photodetector and the timing at which the laser beam is detected by the second photodetector responsive to the laser powers changing.

15. The method of claim 14, further comprising calculating a first time interval defining a time interval between the laser beam detection by the first photodetector and the laser beam detection by the second photodetector, calculating a second time interval defining a time interval between the laser beam detection by the first photodetector and the laser beam detection by the second photodetector, and shifting, based on a difference between the first time interval and the second time interval, an output timing of the laser beam.

16. The method of claim 15, further comprising calculating the difference between the first time interval and the second time interval before the printing at the second speed.

17. The method of claim 16, further comprising shifting, based on the difference between the first time interval and the second time interval, at least one of an exposure start position of the laser beam to the first photoconductor or an exposure start position of the laser beam to the second photoconductor in the printing at the second speed in the main scanning direction.

18. The method of claim 17, further comprising:

detecting the toner image formed on the image carrier, outputting the laser beam with the first laser power while rotating the polygon mirror at the first speed to form a test pattern on the image carrier, and controlling the printing at the first speed and the printing at the second speed based on a detection result of the test pattern.

19. The method of claim 18, further comprising determining at least one of the exposure start position of the laser beam to the first photoconductor or the exposure start position of the laser beam to the second photoconductor, based on a difference between the detection result of the test pattern formed by the laser beam and the detection result of the test pattern formed by the laser beam.

20. The method of claim 19 further comprising shifting, based on the difference between the first time interval and the second time interval, at least one of the exposure start position of the laser beam to the first photoconductor for the exposure start position of the laser beam to the second photoconductor in the printing at the second speed in the main scanning direction.

* * * * *